May 2, 1950 G. W. STIEFVATER 2,506,117
MACHINE FOR CUTTING ALMONDS
Filed Feb. 8, 1949 2 Sheets-Sheet 1

INVENTOR.
GERHARD W. STIEFVATER
BY
ATTORNEY

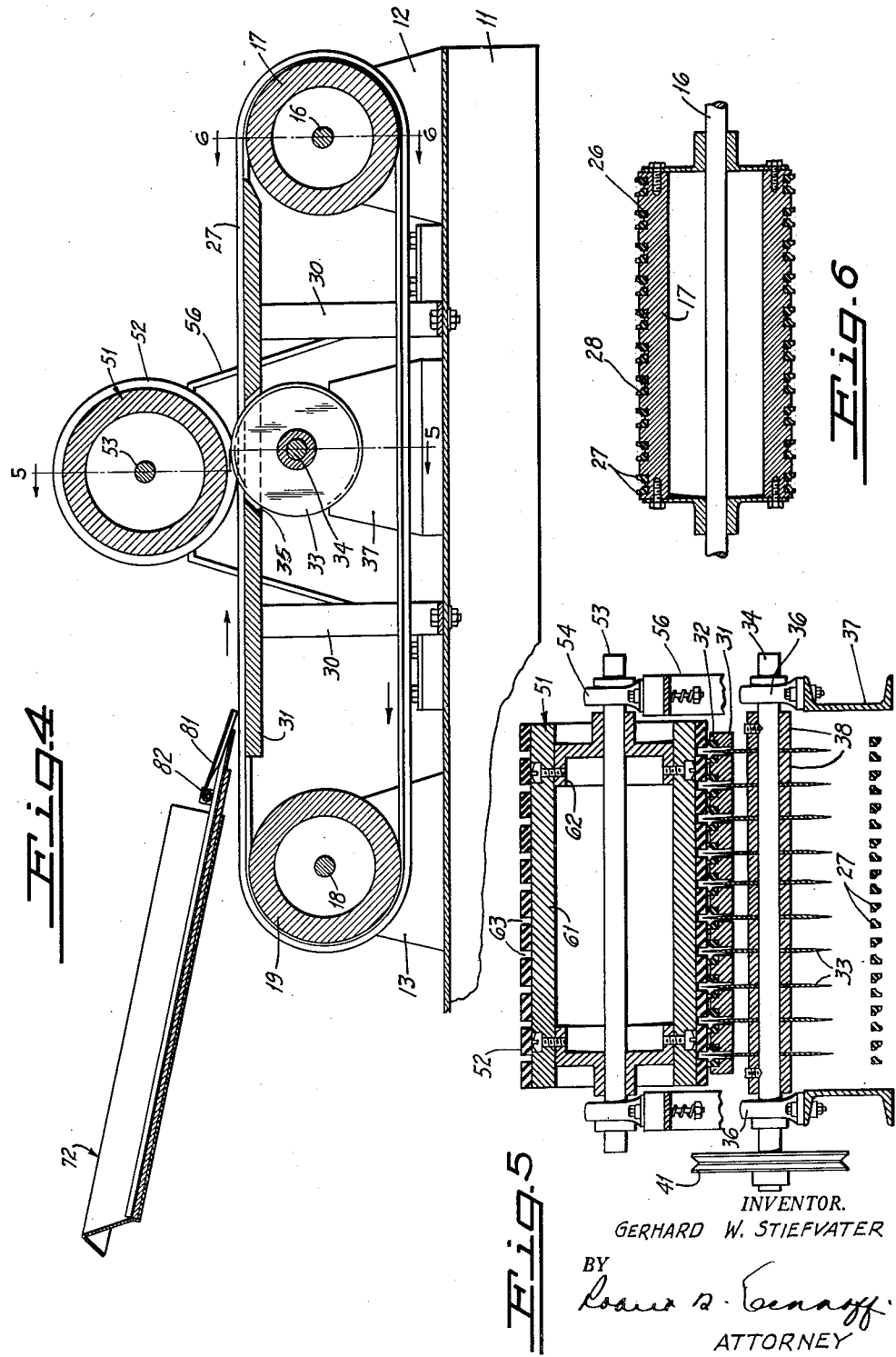

Patented May 2, 1950

2,506,117

UNITED STATES PATENT OFFICE 2,506,117

MACHINE FOR CUTTING ALMONDS

Gerhard W. Stiefvater, Chico, Calif.

Application February 8, 1949, Serial No. 75,267

3 Claims. (Cl. 146—98)

1

This invention relates to a new and an improved device for splitting or cutting almond kernels and the like. For many uses, almond kernels of a given size and weight are particularly desirable. However, the supply of these is relatively limited and it is therefore proposed to utilize kernels of a larger size, cutting these in half to provide almond meat of an acceptable size and weight.

It is generally the broad object of the present invention to provide a machine enabling an almond kernel to be divided in half.

A further object of the present invention is to provide a novel machine for rapidly and continuously cutting almonds.

The invention includes other objects and features of advantage, some of which, together with the foregoing, will appear hereinafter wherein the present preferred form of machine for cutting almonds embodying the present invention is disclosed.

Referring to the drawings accompanying and forming a part hereof,

Figure 4 is a side elevation, partly in section, showing the feeding mechanism and the cutting mechanism.

Figure 5 is a section taken along the line 5—5 of Figure 4.

Figure 6 is a section taken along the line 6—6 of Figure 4.

Figure 1:
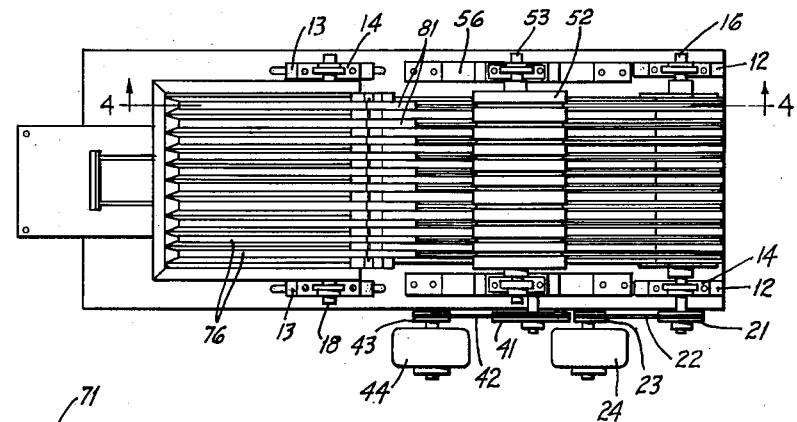
Figure 1 is a plan view of a complete machine.
Figure 2:
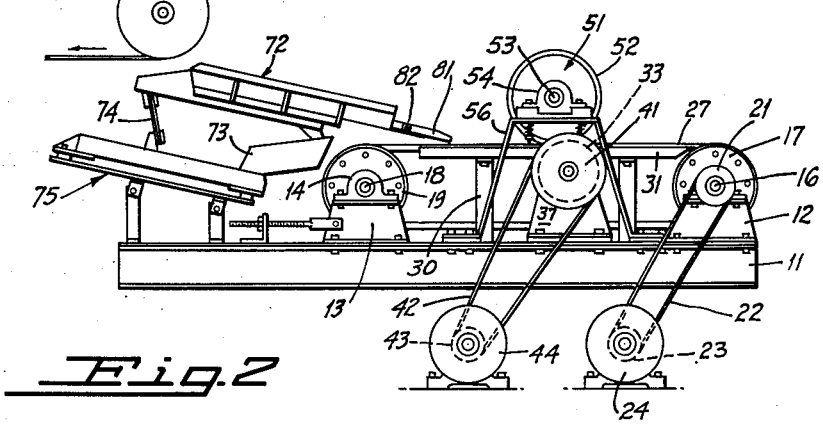
Figure 2 is a side elevation of the machine shown in Figure 1.
Figure 3:
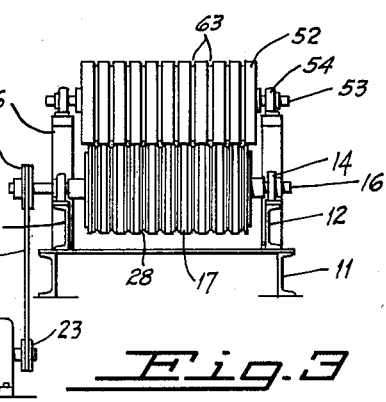
Figure 3 is an end view of the machine.

Referring to the drawings, the machine includes a suitable frame generally indicated at 11; mounted upon the frame on opposite sides thereof are supports 12 and 13, each support having a journal 14 thereon. A shaft 16 is extended between journals 14 on supports 12 and carries a grooved roll 17. Similarly, a shaft 18 is mounted in journals 14 on supports 13, shaft 18 carrying a grooved roll 19. A pulley 21 is provided upon shaft 16 and a V-belt 22 is trained about this and about a pulley 23 driven by motor 24 to rotate roll 17 continuously. Each roll 17 and 19 has a plurality of spaced peripherial grooves 26 formed therein, as appear in Figure 6, in each of which fits a belt 27. The belts move over a path, as will presently appear; the upper run of the belts is supported by a plate 31 which, as appears in Figure 5, includes spaced grooves 32 therein to support belts 27 in a spaced relation; plate 31 is supported by uprights 30 from base 11. The belts are identical except in cross-section; they are

2 fitted about the rolls 17 and 19 in pairs and as many pairs can be employed as are desired. Each belt is formed with an arcuate face and side 28 on the outer side thereof; the belts in each pair are spaced about rolls 17 and 19, and are positioned over the plate 31 so that each cooperating pair of belts provides a recess which, when viewed in cross section, as appears in Figures 5 and 6, is generally U-shaped and is particularly adapted to support an almond kernel so that the almond lays flat upon the adjacent belts in a given pair with the longitudinal axis of the kernel parallel to the run of the belts.

Plate 31 is recessed as at 35 to permit circular knives 33 to pass therethrough to engage almonds moved past the knives by each pair of spaced belts. The several circular knife blades are mounted upon the shaft 34, the latter being carried in journals 36 mounted upon supports 37 carried upon frame 11. Spacers 38 are provided upon shaft 34 to position and secure the several knives in place upon the shaft. Shaft 34 is driven by a pulley 41, a V-belt 42 being trained about this and about a pulley 43 driven by motor 44.

To position almonds for cutting and to retain the almonds in place during cutting, a suitable positioning and retaining means is provided. In the form illustrated, this is shown as a wheel 51 having an outer covering thereon of rubber or other suitable flexible material 52. Wheel 51 is carried by a shaft 53 mounted in journals 54 and carried upon supports 56 on frame 11. The wheel 51 is made up of a cylindrical shell 61 and secured to suitable supports 62 which are in turn fastened to shaft 53. The flexible covering material 52 is grooved as at 63 to admit knives 33 which extend above the upper level of the belts 27.

Referring particularly to Figure 4, it is to be noted that a vertical plane line passing through the axis of shaft 34 is slightly displaced forwardly in the direction of travel of the belt from a vertical plane passing through the axis of shaft 53 so that almonds carried by the belts 27 are engaged with the flexible covering 52 on wheel 51 before engaging knives 33. This enables the flexible covering material first to engage the almond kernels and press them firmly against the belt pair and to retain them securely in place during the cutting of the kernel by the associated and cooperating knife blade 33.

Almond kernels can be fed on to the belts by hand, or by any suitable feeding mechanism; I prefer to accomplish the feeding automatically and to this end I supply the almond kernels on a first conveyor 71, this discharging onto a trough indicated at 72 and which is mounted upon an electric solenoid vibrator structure, generally indicated by numeral 73, and upon a flexible mounting connection 74. The solenoid and the flexible connection are carried upon a suitable sub-base structure generally indicated by numeral 75 and which is in turn mounted upon frame 11.

Trough 72 includes a plurality of adjacent V-shaped or U-shaped grooves, indicated at 76 (Figure 1). The slope of trough 72 is such that the almonds do not fall freely along the trough when the vibrator is not operating, being at an acute angle less than the angle of repose of the almonds on the trough; however, the slope is such that the slight impetus imparted by the vibrator serves to move the almonds along the trough. The trough, plus the vibration, serves to align each almond kernel so that by the time these pass off the end of the grooves in the trough, each kernel is aligned and falls readily into an aligned position on the belts 27 wherein the almond is flat and its major axis is parallel to the run of the belts. To facilitate this and to insure that only one almond is fed at a time, a gate member or flap-like door 81 is hinged as at 82 over the end of each groove 76. The gate member is preferably made of a very light material such as aluminum so that it imparts a very little resistance to the movement of the almond. The flap-like door is carried by the plate 72 and vibrates with the plate so that an almond kernel passing off the trough grooves is tapped gently into aligned position on the belt pairs, each flap-like door extending out over the belt-pair which it serves and vibrating each kernel into alignment on the belt-pair on which it is placed.

In operation, with the several belt pairs being moved continuously and with the knives 33 rotating, the almonds are fed into the trough 72 from conveyor 71; they are quickly aligned and by the time they pass under one of the gates 81 and onto one of the several belt pairs, each is in an aligned position with its longitudinal axis parallel to the direction of advance of the belts and with its sides substantially flat and with one in engagement with the arcuate faces of the belts in the pair. By the time the kernel reaches the wheel 51, it is in substantial alignment and the wheel merely serves to position it accurately and precisely and to retain it securely as it moves into engagement during the cutting by the circular knife; following the cutting operation, the almond halves move on out about wheel 17 and drop off the end to be collected in a suitable receptacle.

From the foregoing, I believe it will be readily apparent that I have provided a relatively novel, simple, rugged device for cutting almonds in halves, which device operates with great accuracy.

I claim:

1. In a machine of the class described, a pair of belts each having a continuous arcuate face formed thereon and cooperating with that on the other belt to provide a receptacle which, in cross-section, is of a V shape, said belts being closely adjacent to but spaced from each other, means for moving said belts over a path, cutting means projecting upwardly between said pair of belts at a cutting station along said path to cut an object on said belts, and a wheel supported above said belt pair and in engagement therewith in substantially opposed relation but with its axis slightly in advance of said cutting means to engage and position an object on said belts prior to cutting and to positively retain such object in engagement with said belts during cutting.

2. In an almond kernel cutting machine, a pair of belts having parallel runs, the contiguous faces of said belts converging downwardly and said belts being slightly spaced apart to provide an open bottomed trough between the belts for reception of almond kernels, means for advancing said belts to advance kernels lying in said trough, a rotatable cutting disc journaled on an axis below said belts and having its cutting edge extending between said belts and into said trough, and a rotatable wheel journaled on an axis above said belts with the periphery of said wheel adjacent the upper surface of each belt, the axis of said wheel being positioned slightly in advance of the axis of said cutting disc in such manner that kernels in said trough advance into pressing engagement with said wheel prior to contact with said cutting disc and remain in such engagement until severed by said cutting disc.

3. In an almond kernel cutting machine, a pair of belts having parallel runs, the contiguous faces of said belts converging downwardly and said belts being slightly spaced apart to provide an open bottomed trough between the belts for reception of almond kernels, means for advancing said belts to advance kernels lying in said trough, a rotatable cutting disc journaled on an axis below said belts and having its cutting edge extending between said belts and into said trough, and a rotatable wheel journaled on an axis above belts with the periphery of said wheel being of flexible, yielding material and positioned adjacent the upper surface of each belt, the axis of said wheel being positioned slightly in advance of the axis of said cutting disc in such manner that kernels in said trough advance into pressing engagement with the yielding periphery of said wheel prior to contact with said cutting disc and are securely held in said trough by such engagement with said wheel until severed by said cutting disc.

GERHARD W. STIEFVATER.

REFERENCES CITED

The following references are of record in the file of this patent:

UNITED STATES PATENTS

| Number | Name | Date |
| --- | --- | --- |
| 735,662 | Gent | Aug. 4, 1903 |
| 752,929 | Shelley | Feb. 23, 1904 |
| 1,000,648 | Wacker | Aug. 15, 1911 |
| 1,185,790 | Greising | June 6, 1916 |
| 1,377,828 | Geese | May 10, 1921 |
| 1,731,115 | Taylor | Oct. 8, 1929 |
| 1,750,431 | Rogers | Mar. 11, 1930 |
| 1,989,983 | Hawkins | Feb. 5, 1935 |
| 2,065,239 | Mills | Dec. 22, 1936 |
| 2,160,693 | Anstice | May 30, 1939 |
| 2,186,084 | Urschel | Jan. 9, 1940 |
| 2,241,650 | Spang | May 13, 1941 |